United States Patent
Li et al.

(10) Patent No.: US 12,132,516 B2
(45) Date of Patent: Oct. 29, 2024

(54) MASSIVE MULTIPLE-INPUT MULTIPLE-OUTPUT CHANNEL EMULATION METHOD AND DEVICE BASED ON OPTICAL MATRIX SWITCHING

(71) Applicant: NATIONAL UNIVERSITY OF DEFENSE TECHNOLOGY, Changsha (CN)

(72) Inventors: Pengpeng Li, Changsha (CN); Zhibin Xiao, Changsha (CN); Baiyu Li, Changsha (CN); Zhicheng Lyu, Changsha (CN); Feixue Wang, Changsha (CN); Wenxiang Liu, Changsha (CN); Lei Chen, Changsha (CN); Xinming Huang, Changsha (CN); Mingzan Xie, Changsha (CN); Huan Liu, Changsha (CN); Shuibin Zhong, Changsha (CN)

(73) Assignee: National University of Defense Technology, Changsha (CN)

( * ) Notice: Subject to any disclaimer, the term of this patent is extended or adjusted under 35 U.S.C. 154(b) by 0 days.

(21) Appl. No.: 18/644,585

(22) Filed: Apr. 24, 2024

(65) Prior Publication Data
US 2024/0283533 A1    Aug. 22, 2024

Related U.S. Application Data

(63) Continuation of application No. PCT/CN2022/141342, filed on Dec. 23, 2022.

(30) Foreign Application Priority Data

Jan. 10, 2022 (CN) .......................... 202210021735.7

(51) Int. Cl.
*H04B 10/079* (2013.01)
*H04Q 11/00* (2006.01)

(52) U.S. Cl.
CPC ... *H04B 10/07955* (2013.01); *H04Q 11/0005* (2013.01); *H04Q 2011/0039* (2013.01); (Continued)

(58) Field of Classification Search
CPC ......... H04B 10/07955; H04Q 11/0005; H04Q 2011/0039; H04Q 2213/13335; H04Q 2011/0058
See application file for complete search history.

(56) References Cited

U.S. PATENT DOCUMENTS 4,783,850 A * 11/1988 MacDonald ....... H04Q 11/0005
                                                    398/48
7,136,587 B1    11/2006 Davis et al.
(Continued)

FOREIGN PATENT DOCUMENTS

CN    102122994 A    7/2011
CN    103138855 A    6/2013
(Continued)

OTHER PUBLICATIONS

Josep M. Fabrega, "Experimental Demonstration of Extended 5G Digital Fronthaul Over a Partially Disaggregated WDM/SDM Network", Sep. 2021, IEEE Journal on Selected Areas in Communications, vol. 39, No. 9, All pages (Year: 2021).*
(Continued)

Primary Examiner — Pranesh K Barua
(74) Attorney, Agent, or Firm — Pilloff Passino & Cosenza LLP; Rachel K. Pilloff; Sean A. Passino

(57) ABSTRACT

A massive multiple-input multiple-output channel emulation method and a device based on optical matrix switching are provided. The method is realized based on a massive multiple-input multiple-output channel emulation system, which includes a plurality of channel preprocessing subsystems, an optical switching subsystem, a plurality of channel charac-
(Continued)

teristic emulation subsystems, a self-checking and self-correcting subsystem, a mathematical simulation and monitoring subsystem and a time-frequency synthesis and distribution subsystem. All the subsystems are interconnected by various optical fiber connections, which are used to transmit high-speed data signals, communication information, control instructions, frequency, pulse and time signals, and have the centralized-distributed layout ability of various devices in the system based on long-distance transmission of optical fiber signals, and have the massive parallel expansion ability of the number of system signal input and output links.

10 Claims, 7 Drawing Sheets

(52) U.S. Cl.
 CPC ............. *H04Q 2011/0058* (2013.01); *H04Q 2213/13335* (2013.01)

(56) References Cited

U.S. PATENT DOCUMENTS

| | | | | |
|---|---|---|---|---|
| 7,310,522 | B2* | 12/2007 | Geile | .............. H04L 5/1484 |
| | | | | 375/E7.002 |
| 11,476,931 | B1* | 10/2022 | Routh | .............. H04Q 11/0062 |
| 2002/0044315 | A1 | 4/2002 | Sugawara et al. | |
| 2004/0208555 | A1* | 10/2004 | Pau | .............. H04Q 11/0005 |
| | | | | 398/56 |
| 2018/0123724 | A1* | 5/2018 | Zhang | .............. H04J 14/0257 |

FOREIGN PATENT DOCUMENTS

| | | | |
|---|---|---|---|
| CN | 105208298 | A | 12/2015 |
| CN | 107683573 | A | 2/2018 |
| CN | 108449126 | A | 8/2018 |
| CN | 110401824 | A | 11/2019 |
| CN | 110601769 | A | 12/2019 |
| CN | 111208746 | A | 5/2020 |
| CN | 112468220 | A | 3/2021 |
| CN | 112468222 | A | 3/2021 |
| CN | 113472464 | A | 10/2021 |
| CN | 113904744 | A | 1/2022 |
| CN | 114374451 | A | 4/2022 |
| WO | 2022002001 | A1 | 1/2022 |

OTHER PUBLICATIONS

Wang Zhi, "Design and Implementation of Simulator of Spaceborne Measurement and Communication System," Jan. 2015, 23(1).
Zhang Bin et al., "Design of FSOI system based on the channel state information with space-time coding," Jan. 2015.
International Search Report for PCT/CN2022/141342, mailed Mar. 8, 2023.
Notification to Grant Patent for China Application No. 202210021735.7, mailed Jul. 31, 2023.
First Search Report for China Application No. 202210021735.7, dated Jul. 26, 2023.

* cited by examiner

| The plurality of channel preprocessing subsystems receive multiplex radio-frequency input signals with same signal sources or different signal sources to preprocess the multiplex radio-frequency input signals, and the preprocessed multiplex radio-frequency input signals are transmitted to the optical switching subsystem through the optical fibers in a form of multiplex 10G optical signals, wherein each of 10G optical signals comprises a plurality of groups of data | S1 |

| Based on identification results of a plurality of input ports of the optical switching subsystem for each group of data contained in the multiplex 10G optical signals, distributing the each group of data to a plurality of output ports of the optical switching subsystem according to specified addresses, so as to output redistributed multiplex 10G optical signals to the plurality of channel characteristic emulation subsystems through the plurality of output ports | S2 |

| The plurality of channel characteristic emulation subsystems perform a multi-channel parallel channel emulation operation on the redistributed multiplex 10G optical signals to obtain wireless radio-frequency signals added with emulated channel characteristics, and the wireless radio-frequency signals are sent to each signal receiving terminal | S3 |

FIG. 2

MASSIVE MULTIPLE-INPUT MULTIPLE-OUTPUT CHANNEL EMULATION METHOD AND DEVICE BASED ON OPTICAL MATRIX SWITCHING

CROSS-REFERENCE TO RELATED APPLICATIONS

This application is a continuation of PCT/CN2022/141342, filed on Dec. 23, 2022 and claims priority of Chinese Patent Application No. 202210021735.7, filed on Jan. 10, 2022, the entire contents of which are incorporated herein by reference.

TECHNICAL FIELD

The application belongs to the technical field of communication transmission, and in particular to a massive multiple-input multiple-output channel emulation method and a device based on an optical matrix switching.

BACKGROUND

Various signal transmitting devices, signal forwarding devices, signal receiving devices and other wireless signal transceiver processing devices are included in massive radio systems or massive signal docking scenarios such as communications, radar, electronic countermeasures, etc., and the RF signals are introduced into the dynamic characteristics generated by the relative motion between the transceiver platforms and the characteristics of the environmental channel (including, for example, the ionosphere, the troposphere, the multipath effect, and the masking effect, etc.) during the transmission of the RF signals in the space, which makes the characteristics of the signal power, frequency, phase, and time delay and so on to develop real-time changes. Then, before the actual operation of the above systems, the signal transmitting devices, signal forwarding devices and signal receiving devices are all required to be verified in terms of functional performance through docking test. The conventional static signal direct docking test fails to provide an equivalent of the real working environment of the relevant devices, while the signal transmission channel emulation system is capable of emulating the dynamic transceiving signals among massive signal transmitting devices, signal forwarding devices and signal receiving devices, and superimpose the dynamic transmission characteristics and environmental channel characteristics of each physical link on the radio-frequency signal in real time, so that the ground docking test may truly reflect the performance of related devices in the actual dynamic operation of the massive system.

Ordinary single-stage channel emulation device is capable of supporting wired channels only, such as 4 or 8 channels, and multi-channel parallel expansion is not supported since the simulation data-driven control is relatively independent and the time-frequency system may not be synchronized and unified; moreover, considering that some signal transmitting devices, signal forwarding devices and signal receiving devices are limited by the volume, weight, installation status, difficulty to be moved easily (such as large ground base stations and assembled satellites, etc.) and physical distance between them (hundreds of meters or even thousands of kilometers), it is basically difficult to carry out signal interconnection with ordinary single-stage channel emulation device, and therefore the massive multiple-input multiple-output channel emulation required for internal docking test of massive systems may not be supported.

SUMMARY

In order to solve the above technical problems, the application provides a massive multiple-input multiple-output channel emulation method based on an optical matrix switching.

In an aspect of the application discloses a massive multiple-input multiple-output channel emulation method based on an optical matrix switching. The method is realized based on a massive multiple-input multiple-output channel emulation system, the massive multiple-input multiple-output channel emulation system includes a plurality of channel preprocessing subsystems, an optical switching subsystem, a plurality of channel characteristic emulation subsystems, a time-frequency synthesis and distribution subsystem, a mathematical simulation and monitoring subsystem and a self-checking and self-correcting subsystem. The method specifically includes the following steps:

step S1, receiving multiplex radio-frequency input signals with same signal sources or different signal sources by the plurality of channel preprocessing subsystems to preprocess the multiplex radio-frequency input signals, and transmitting the preprocessed multiplex radio-frequency input signals to the optical switching subsystem through the optical fibers in a form of multiplex 10G optical signals, where each of 10G optical signals includes a plurality of groups of data;

step S2, based on identification results of a plurality of input ports of the optical switching subsystem for each group of data contained in the multiplex 10G optical signals, distributing the each group of data to a plurality of output ports of the optical switching subsystem according to specified addresses, so as to output redistributed multiplex 10G optical signals to the plurality of channel characteristic emulation subsystems through the plurality of output ports;

step S3, performing a multi-channel parallel channel emulation operation on the redistributed multiplex 10G optical signals by the plurality of channel characteristic emulation subsystems to obtain wireless radio-frequency signals added with emulated channel characteristics, and transmitting the wireless radio-frequency signals to each signal receiving terminalristics, and the wireless radio-frequency signals are transmitted to each signal receiving terminal.

In an aspect of the method of the present application, the channel preprocessing subsystems include a plurality of distributed and parallelly expanded multi-channel channel preprocessing terminals, where the multi-channel channel preprocessing terminals receive a frequency, a pulse and a time signal input by the time-frequency synthesis and distribution subsystem for a driving, and the multi-channel channel preprocessing terminals receive communication and control instructions from the mathematical simulation and monitoring subsystem; the multi-channel channel preprocessing terminals are connected to the optical switching subsystem through optical fibers, so that a parallel scale expansion of a number of channel preprocessing links is realized.

In an aspect of the method of the present application, in the step S1, the multi-channel channel preprocessing terminal is used to perform a preprocessing on the multiplex radio-frequency input signals, specifically including:

adjusting a signal power of the multiplex radio-frequency input signals, performing a simulation down-conversion and out-of-band filtering processing, and sampling obtained intermediate frequency signals after an analog-to-digital conversion to obtain sampled digital signals;

performing a digital down-conversion and decimation filtering processing on the digital signals, and obtaining the multiplex 10G optical signals through a packaging processing and an electro-optical conversion.

In an aspect of the method of the present application, in the step S2, the optical switching subsystem receives control and scheduling instructions from the mathematical simulation and monitoring subsystem, the plurality of input ports identify indication marks of the each group of data in the multiplex 10G optical signals, and the optical switching subsystem distributes the each group of data to the plurality of output ports of the optical switching subsystem according to the specified addresses based on the identification result, thus realizing a multiple-input multiple-output scheduling, specifically including: a same output port receives a plurality of groups of data from different input ports, and the plurality of groups of data from a same input port are transmitted to different output ports.

In an aspect of the method of the present application, when an adding or deleting processing of the multi-channel channel preprocessing terminals is terminated, other multi-channel channel preprocessing terminals maintain an original state; the optical switching subsystem has a main engine and a standby engine, the main engine and the standby engine respectively have a function of independently supporting the optical switching subsystem, and when the main engine fails, the standby engine is seamlessly switched to maintain the optical switching subsystem in a working state; the optical switching subsystem has a scale parallel expansion ability, and when a scale expansion is performed on input-output links of the massive multiple-input multiple-output channel emulation system, a scale of an optical switching board of the optical switching subsystem is directly expanded in parallel.

In an aspect of the method of the present application, in the step S3, the plurality of channel characteristic emulation subsystems include a plurality of parallelly expanded multi-channel channel characteristic emulation terminals, where the multi-channel channel characteristic emulation terminals receive the frequency, the pulse and the time signal input by the time-frequency synthesis and distribution subsystem for the driving, and the multi-channel channel characteristic emulation terminals receive the communication and control instructions from the mathematical simulation and monitoring subsystem, and the multi-channel channel characteristic emulation terminals are connected to the optical fibers output by the optical switching subsystem to realize the parallel scale expansion of a channel characteristic emulation.

In an aspect of the method of the present application, in the step S3, performing the multi-channel parallel channel emulation operation on the redistributed multiplex 10G optical signals by using the multi-channel channel characteristic emulation terminals, so as to obtain the wireless radio-frequency signal added with the emulated channel characteristics, specifically including:

according to simulation data and control data among each of signal transmitting devices, signal forwarding devices and signal receiving devices transmitted by the mathematical simulation and monitoring subsystem, generating signals after a channel characteristic change due to a relative motion, a troposphere, an ionosphere, a multipath and a shielding, so as to realize the multi-channel parallel channel emulation operation;

obtaining emulated intermediate frequency signals by the digital signals subjected to the multi-channel parallel channel emulation operation through a digital-to-analog conversion, and transmitting the emulated intermediate frequency signals to each signal receiving terminal as wireless radio-frequency signals added with the emulated channel characteristics after a simulation up-conversion processing, a filtering and a power adjustment.

The application also discloses a massive multiple-input multiple-output channel emulation device based on an optical matrix switching. The device is realized based on a massive multiple-input multiple-output channel emulation system, and the massive multiple-input multiple-output channel emulation system includes a plurality of channel preprocessing subsystems, an optical switching subsystem, a plurality of channel characteristic emulation subsystems, a time-frequency synthesis and distribution subsystem, a mathematical simulation and monitoring subsystem and a self-checking and self-correcting subsystem. The device specifically includes:

a first processing unit, configured to call the plurality of channel preprocessing subsystems to receive multiplex radio-frequency input signals with same signal sources or different signal sources to preprocess the multiplex radio-frequency input signals, and transmitting the preprocessed multiplex radio-frequency input signals to the optical switching subsystem through the optical fibers in a form of multiplex 10G optical signals, where each of 10G optical signals includes a plurality of groups of data;

a second processing unit, configured to call the optical switching subsystem, and based on identification results of a plurality of input ports of the optical switching subsystem for each group of data contained in the multiplex 10G optical signals, distributing the each group of data to a plurality of output ports of the optical switching subsystem according to specified addresses, so as to output redistributed multiplex 10G optical signals to the plurality of channel characteristic emulation subsystems through the plurality of output ports; and a third processing unit, configured to call the plurality of channel characteristic emulation subsystems to perform a multi-channel parallel channel emulation operation on the redistributed multiplex 10G optical signals to obtain wireless radio-frequency signals added with emulated channel characteristics, and the wireless radio-frequency signals are transmitted to each signal receiving terminal.

In an aspect of the device of the present application, the channel preprocessing subsystems include a plurality of distributed and parallelly expanded multi-channel channel preprocessing terminals, where the multi-channel channel preprocessing terminals receive a frequency, a pulse and a time signal input by the time-frequency synthesis and distribution subsystem for a driving, and the multi-channel channel preprocessing terminals receive communication and control instructions from the mathematical simulation and monitoring subsystem; the multi-channel channel preprocessing terminals are connected to the optical switching subsystem through optical fibers, so that a parallel scale expansion of a number of channel preprocessing links is realized.

In an aspect of the device of the present application, where the multi-channel channel preprocessing terminal is used to perform a preprocessing on the multiplex radio-frequency input signals, specifically including:

adjusting a signal power of the multiplex radio-frequency input signals, performing a simulation down-conversion and out-of-band filtering processing, and sampling obtained intermediate frequency signals after an analog-to-digital conversion to obtain sampled digital signals;

performing a digital down-conversion and decimation filtering processing on the digital signals, and obtaining the multiplex 10G optical signals through a packaging processing and an electro-optical conversion.

In an aspect of the device of the present application, the optical switching subsystem receives control and scheduling instructions from the mathematical simulation and monitoring subsystem, the plurality of input ports identify indication marks of the each group of data in the multiplex 10G optical signals; the second processing unit is specifically configured to call the optical switching subsystem to distribute the each group of data to the plurality of output ports of the optical switching subsystem according to the specified addresses based on the identification result, thus realizing a multiple-input multiple-output scheduling, specifically including: a same output port receives a plurality of groups of data from different input ports, and the plurality of groups of data from a same input port are transmitted to different output ports.

In an aspect of the device of the present application, when an adding or deleting processing of the multi-channel channel preprocessing terminals is terminated, other multi-channel channel preprocessing terminals maintain an original state; the optical switching subsystem has a main engine and a standby engine, the main engine and the standby engine respectively have a function of independently supporting the optical switching subsystem, and when the main engine fails, the standby engine is seamlessly switched to maintain the optical switching subsystem in a working state; the optical switching subsystem has a scale parallel expansion ability, and when a scale expansion is performed on input-output links of the massive multiple-input multiple-output channel emulation system, a scale of an optical switching board of the optical switching subsystem is directly expanded in parallel.

In an aspect of the device of the present application, the plurality of channel characteristic emulation subsystems include a plurality of parallelly expanded multi-channel channel characteristic emulation terminals, where the multi-channel channel characteristic emulation terminals receive the frequency, the pulse and the time signal input by the time-frequency synthesis and distribution subsystem for the driving, and the multi-channel channel characteristic emulation terminals receive the communication and control instructions from the mathematical simulation and monitoring subsystem, and the multi-channel channel characteristic emulation terminals are connected to the optical fibers output by the optical switching subsystem to realize the parallel scale expansion of a channel characteristic emulation.

In an aspect of the device of the present application, the third processing unit is specifically configured to perform the multi-channel parallel channel emulation operation on the redistributed multiplex 10G optical signals by using the multi-channel channel characteristic emulation terminals, so as to obtain the wireless radio-frequency signal added with the emulated channel characteristics, specifically including: according to simulation data and control data among each of signal transmitting devices, signal forwarding devices and signal receiving devices transmitted by the mathematical simulation and monitoring subsystem, generating signals after a channel characteristic change due to a relative motion, a troposphere, an ionosphere, a multipath and a shielding, so as to realize the multi-channel parallel channel emulation operation;

obtaining emulated intermediate frequency signals by the digital signals subjected to the multi-channel parallel channel emulation operation through a digital-to-analog conversion, and transmitting the emulated intermediate frequency signals to each signal receiving terminal as wireless radio-frequency signals added with the emulated channel characteristics after a simulation up-conversion processing, a filtering and a power adjustment.

In an aspect of the application discloses an electronic device. The electronic device includes a memory and a processor, where the memory stores a computer program, and when the processor executes the computer program, the steps in the massive multiple-input multiple-output channel emulation method based on an optical matrix switching described in any one of an aspect of the present disclosure are realized.

In an aspect of the present application discloses a computer-readable storage medium. A computer program is stored on the computer-readable storage medium, and when the computer program is executed by a processor, the steps in the massive multiple-input multiple-output channel emulation method based on an optical matrix switching described in any one of an aspect of the present disclosure are realized.

To sum up, the scheme includes: a parallelly expanded channel preprocessing subsystem, which includes a plurality of distributed and parallelly expanded multi-channel channel preprocessing terminals, and may be installed at the wireless radio-frequency signal input terminal for collecting and preprocessing a plurality of wireless radio-frequency signals with the same or different signal sources, and converting data signals into optical signals for output; the matrix optical switching subsystem is used to complete the optical signal aggregation, replication and distribution of massive multiple-input multiple-output signal conversion; the parallelly expanded channel characteristic emulation subsystem includes a plurality of parallelly expanded multi-channel channel characteristic emulation terminals, which are used for receiving optical signals and converting the optical signals into data signals, performing multi-channel channel emulation operation, and outputting wireless radio-frequency signals with added channel characteristics; time-frequency synthesis and distribution subsystem, which comprehensively generates the required frequency, pulse and time signals, completes frequency modulation and phase modulation operations, and distributes the required time-frequency signals to each subsystem terminal according to the system scale requirements; the mathematical simulation and monitoring subsystem is used for simulating and calculating the tracks and various dynamic parameters among massive among signal transmitting devices, signal forwarding devices and signal receiving devices in the system, distributing the tracks and various dynamic parameters and controlling the channel emulation terminal to emulate the channel characteristics, and simultaneously sending control instructions and parameter configuration instructions to each subsystem to complete the monitoring and control of the system; the self-checking and self-correcting subsystem mainly completes the self-checking of the working state of the system itself and the self-correcting function of each channel link of the system. In the system, all kinds of signals, data and information between subsystems and devices may be transmitted by gigabit and 10 gigabit optical fibers, with unlimited transmission distance and field layout.

Compared with the prior art, the technical scheme provided by the application has the following beneficial effects: the massive multiple-input multiple-output channel characteristic emulation system based on an optical matrix switching designed according to the application may meet the requirements that massive wireless signal links are interconnected and docked among massive signal transmitting devices, signal forwarding devices and signal receiving devices in massive systems such as communication, radar and electronic countermeasures, and by designing parallelly expanded channel preprocessing terminals and channel characteristic emulation terminals with electro-optical/photoelectric conversion interface, multiple-input multiple-output signals are aggregated, copied and distributed in the form of high-density matrix optical exchange, and a massive channel emulation system with dynamic cross-interconnection and docking capability between massive wireless signals is realized. It will not affect the consistency of multi-links or the collaborative simulation between multi-links by increasing the number of device sets and the data capacity of optical switching matrix. With N hardware channel links, the simulation scale of N×N matrix channels may be realized, and the benefit of directly expanding the scale of parallel channel emulation links in a multiple relationship may be obtained, which significantly reduces the complexity of massive channel emulation system, the difficulty of parallel scale expansion and the hardware cost. All signals between devices in the system may be interconnected by the optical fibers, and each subsystem and each single device in the subsystem may be distributed, and the mutual distance between devices is only limited by the optical fiber transmission capacity (ranging from hundreds of meters to thousands of kilometers), thus meeting the requirements of various venues and application scenarios; this massive system architecture based on optical matrix switching is not only limited to the realization of channel emulation system, but also may be used for the design and implementation of various massive communication, radar and electronic countermeasures systems supporting signal transceiver.

BRIEF DESCRIPTION OF THE DRAWINGS

In order to explain the specific embodiment of the present application or the technical scheme in the prior art more clearly, the drawings needed to be used in the description of the specific embodiment or the prior art will be briefly introduced below. Obviously, the drawings in the following description are some embodiments of the present application, and other drawings may be obtained according to these drawings without creative work.

FIG. 2 is a flowchart of a massive multiple-input multiple-output channel emulation method based on an optical matrix switching according to an embodiment of the present application.

DETAILED DESCRIPTION OF THE EMBODIMENTS

In order to make the objective, technical scheme and advantages of the embodiment of the application more clearly, the technical scheme in the embodiment of the application will be described clearly and completely with the attached drawings. Obviously, the described embodiment is only a part of the embodiment of the application, but not the whole embodiment. Based on the embodiments in the present application, all other embodiments obtained by people of ordinary skill in the field without creative labor belong to the protection scope of the present application.

Figure 1:
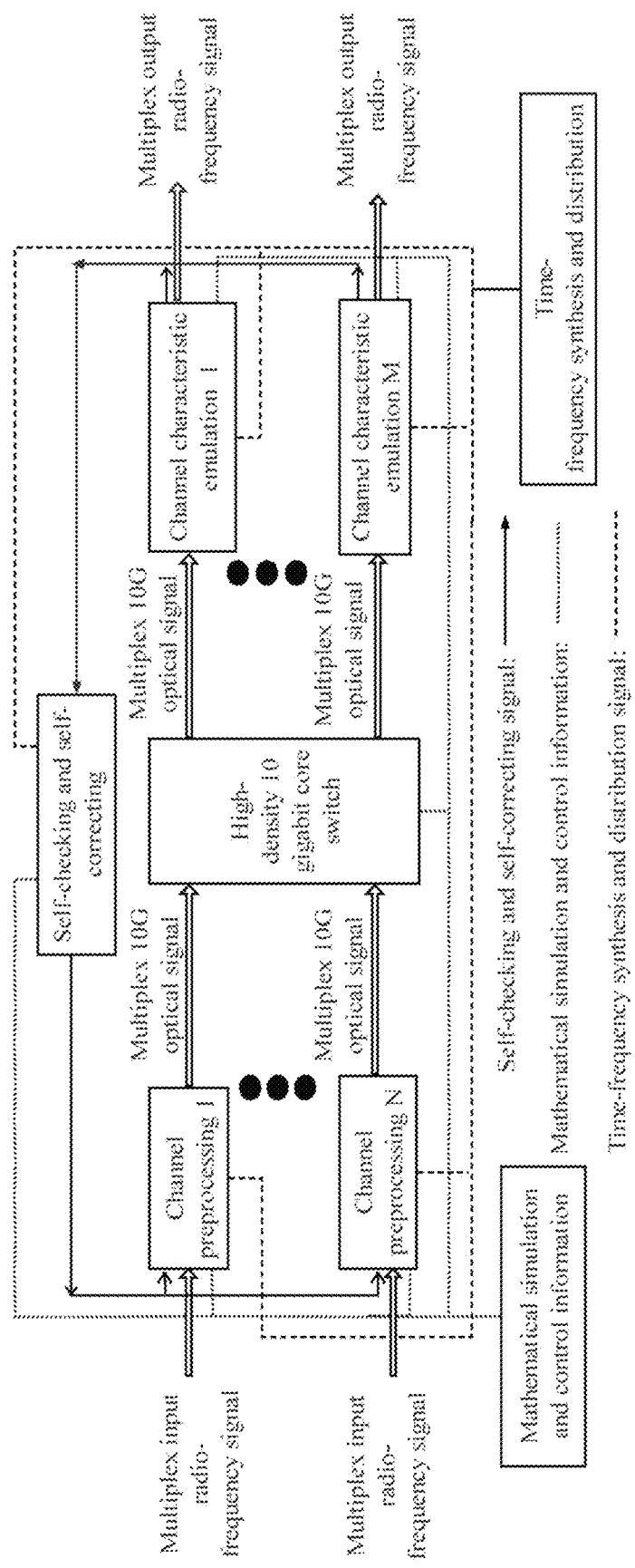
FIG. 1 is a schematic diagram of a massive multiple-input multiple-output channel emulation system according to an embodiment of the present application.

In an aspect of the application discloses a massive multiple-input multiple-output channel emulation method based on an optical matrix switching, which is realized based on a massive multiple-input multiple-output channel emulation system. FIG. 1 is a schematic diagram of a massive multiple-input multiple-output channel emulation system according to an embodiment of the present application. As shown in FIG. 1, the massive multiple-input multiple-output channel emulation system includes a plurality of channel preprocessing subsystems (channel preprocessing), an optical switching subsystem (switch), a plurality of channel characteristic emulation subsystems (channel characteristic emulation), a self-checking and self-correcting subsystem, a mathematical simulation and monitoring subsystem, and a time-frequency synthesis and distribution subsystem.

FIG. 2 is a flowchart of a massive multiple-input multiple-output channel emulation method based on an optical matrix switching according to an embodiment of the present application. As shown in FIG. 2, the method specifically includes:
step S1, receiving multiplex radio-frequency input signals with same signal sources or different signal sources by the plurality of channel preprocessing subsystems to preprocess the multiplex radio-frequency input signals, and transmitting the preprocessed multiplex radio-frequency input signals to the optical switching subsystem through the optical fibers in a form of multiplex 10G optical signals, where each of 10G optical signals includes a plurality of groups of data;
step S2, based on identification results of a plurality of input ports of the optical switching subsystem for each group of data contained in the multiplex 10G optical signals, distributing the each group of data to a plurality of output ports of the optical switching subsystem according to specified addresses, so as to output redistributed multiplex 10G optical signals to the plurality of channel characteristic emulation subsystems through the plurality of output ports;
step S3, performing a multi-channel parallel channel emulation operation on the redistributed multiplex 10G optical signals by the plurality of channel characteristic emulation subsystems to obtain wireless radio-frequency signals added with emulated channel characteristics, and transmitting the wireless radio-frequency signals to each signal receiving terminalristics, and the wireless radio-frequency signals are transmitted to each signal receiving terminal.

In some embodiments, the channel preprocessing subsystems include a plurality of distributed and parallelly expanded multi-channel channel preprocessing terminals, where the multi-channel channel preprocessing terminals receive a frequency, a pulse and a time signal input by the time-frequency synthesis and distribution subsystem for a driving, and the multi-channel channel preprocessing terminals receive communication and control instructions from the mathematical simulation and monitoring subsystem; the multi-channel channel preprocessing terminals are connected to the optical switching subsystem through optical fibers, so that a parallel scale expansion of a number of channel preprocessing links is realized.

In some embodiments, in step S1, the multi-channel channel preprocessing terminal is used to perform a preprocessing on the multiplex radio-frequency input signals, specifically including:

adjusting a signal power of the multiplex radio-frequency input signals, performing a simulation down-conversion and out-of-band filtering processing, and sampling obtained intermediate frequency signals after an analog-to-digital conversion to obtain sampled digital signals; performing a digital down-conversion and decimation filtering processing on the digital signals, and obtaining the multiplex 10G optical signals through a packaging processing and an electro-optical conversion.

Figure 3:
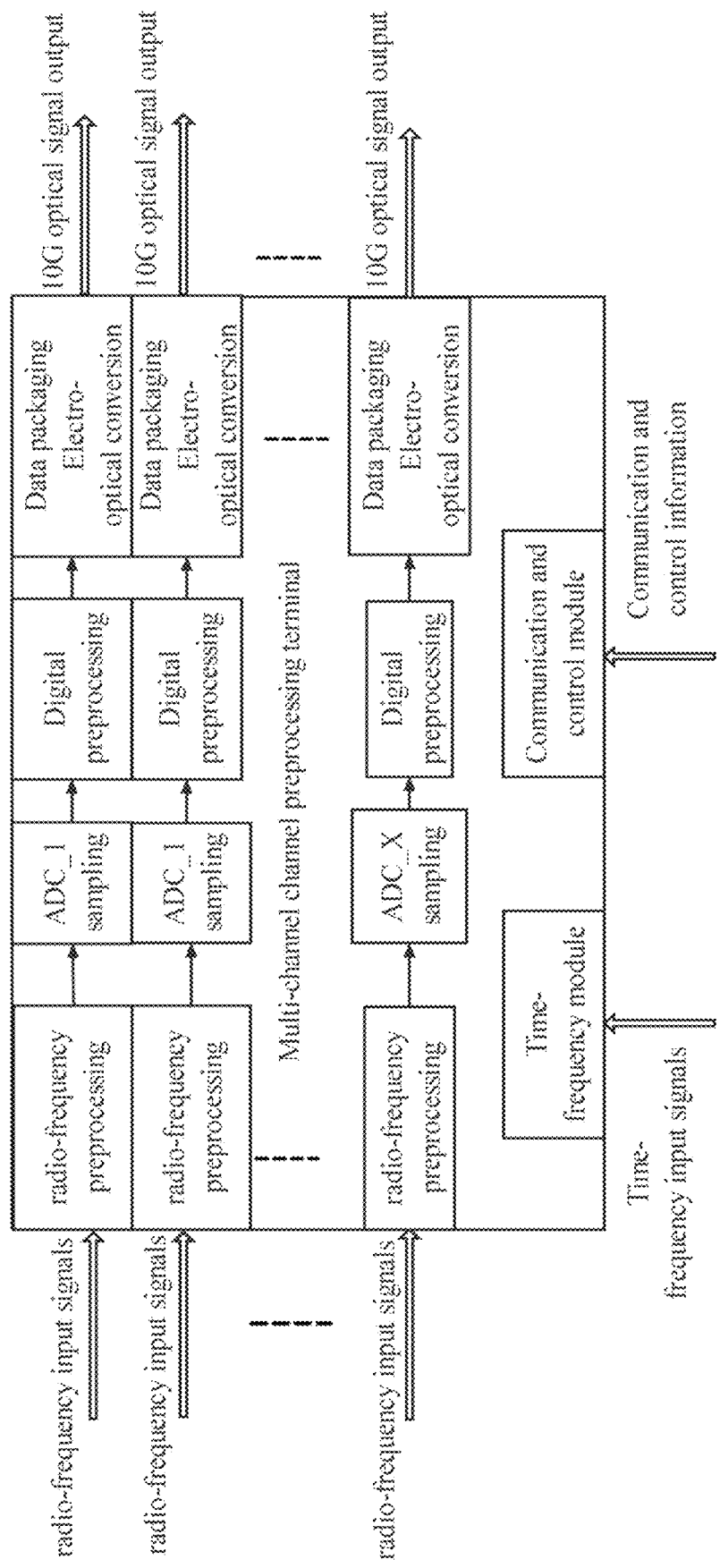
FIG. 3 is a schematic diagram of a parallelly expanded multi-channel channel preprocessing terminals according to an embodiment of the present application.

FIG. 3 is a schematic diagram of a parallelly expanded multi-channel channel preprocessing terminals according to an embodiment of the present application. As shown in FIG. 3, the parallelly expanded channel preprocessing subsystem includes a plurality of distributed and parallelly expanded multi-channel channel preprocessing terminals, which may be installed at the wireless radio-frequency signal input terminal for collecting and preprocessing a plurality of wireless radio-frequency signals with the same or different signal sources. A plurality of multi-channel channel preprocessing terminals receive a frequency, a pulse and a time signal input by the time-frequency synthesis and distribution subsystem for a driving, and receive communication and control instructions from the mathematical simulation and monitoring subsystem, so that a parallel scale expansion of a number of channel preprocessing links may be realized directly by increasing the number of devices. The terminal carries out the radio-frequency preprocessing on the received multiplex radio-frequency signals, reasonably adjusts the signal power, and after simulation down-conversion and out-of-band filtering processing, the obtained intermediate frequency signals are filtered and transmitted to different ADC converters to complete ADC sampling, and the sampled digital signals are subjected to digital down-conversion and decimation filtering processing, and the relevant protocols required for data encapsulation are packaged according to the instructions of the mathematical simulation and monitoring subsystem. At the same time, the packaged 10G data are converted into electro-optical signals and output to the matrix optical switching subsystem through optical fibers. In the system, all kinds of signals, data, information transmission forms between subsystems and devices may use gigabit, 10 gigabit and other optical fibers, with unlimited transmission distance and site layout.

In some embodiments, in step S2, the optical switching subsystem receives control and scheduling instructions from the mathematical simulation and monitoring subsystem, the plurality of input ports identify indication marks of the each group of data in the multiplex 10G optical signals; the second processing unit is specifically configured to call the optical switching subsystem to distribute the each group of data to the plurality of output ports of the optical switching subsystem according to the specified addresses based on the identification result, thus realizing a multiple-input multiple-output scheduling, specifically including: a same output port receives a plurality of groups of data from different input ports, and the plurality of groups of data from a same input port are transmitted to different output ports.

In some embodiments, when an adding or deleting processing of the multi-channel channel preprocessing terminals is terminated, other multi-channel channel preprocessing terminals maintain an original state; the optical switching subsystem has a main engine and a standby engine, the main engine and the standby engine respectively have a function of independently supporting the optical switching subsystem, and when the main engine fails, the standby engine is seamlessly switched to maintain the optical switching subsystem in a working state; the optical switching subsystem has a scale parallel expansion ability, and when a scale expansion is performed on input-output links of the massive multiple-input multiple-output channel emulation system, a scale of an optical switching board of the optical switching subsystem is directly expanded in parallel.

Figure 4:
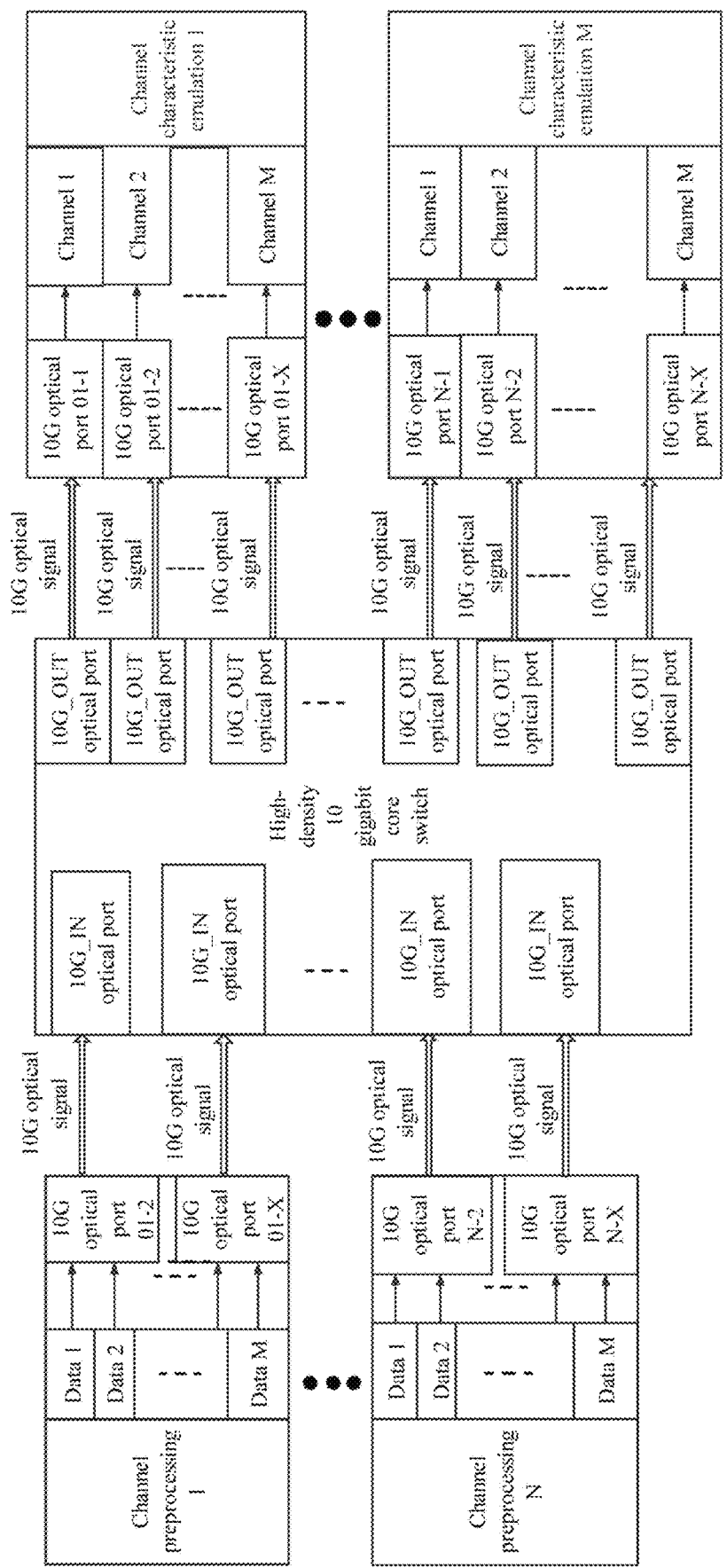
FIG. 4 is a schematic diagram of an optical switching subsystem according to an embodiment of the present application.

FIG. 4 is a schematic diagram of an optical switching subsystem according to an embodiment of the present application. As shown in FIG. 4, the matrix optical switching subsystem adopts the matrix optical switching system architecture, and the whole system realizes signal transmission based on the optical transmission architecture. The channel preprocessing device collects the transmitted signals, converts the transmitted signals into optical signals after preprocessing, and the channel emulation device receives the optical signals, and adds the channel characteristic emulation parameters to each transmitted signal. As the core switching hub of the system, the high-density 10 gigabit switch completes the functions of multiple-input multiple-output management, replication and scheduling of 10 gigabit optical signals, directly expanding the data exchange capacity of the 10 gigabit switch, and may support the scale expansion requirements of channel emulation links. The 10 gigabit switch needs to receive the control and scheduling instructions from the mathematical simulation and monitoring subsystem, identify and process the relevant indicators in the optical data of the input port, and distribute the relevant indicators to different output ports according to the specified addresses, so as to complete the functions of multiple-input multiple-output scheduling, the modulation of signal packets received by different input ports at the same output port, the data replication and distribution scheduling of signals transmitted from the same input port to different output ports, and the switching of data flow direction relationships between different input and output ports, thus realizing the high-speed processing flow of massive multiple-input multiple-output optical matrix switching. Each channel preprocessing terminal sends data to a plurality of channel emulation terminals, a 10 gigabit switch separates multiple groups of information streams input from a single port and distributes the information to different output ports according to requirements, and the channel preprocessing terminals send data to different channel emulation terminals in different time periods, and this dynamic change is realized by controlling the 10 gigabit switch through a dedicated external interface. Each channel emulation terminal receives data from multiple channel preprocessing terminals, and the channel preprocessing terminals received in different time periods will change dynamically. When receiving data from a newly added channel preprocessing terminal or stopping receiving data from one of the channel preprocessing terminals, it will not affect other data flows being received by the channel emulation terminal. This dynamic change is realized by controlling a 10 gigabit switch through a dedicated external interface. Meanwhile, from the requirements of stable operation of the system, 10 gigabit switch needs to have main and standby engines, and each engine has independent support ability to prevent data exchange from being completed when the data engine is damaged; the virtual all-in-one capability may support two 10 gigabit switches to be active and standby for each other and realize seamless switching. The optical switching subsystem has the scale parallel expansion ability, and when the scale of the input and output links of a massive multiple-input multiple-output channel emulation system is expanded, the scale of the optical switching board of the optical switching subsystem may be directly expanded in parallel.

In some embodiments, in the step S3, the plurality of channel characteristic emulation subsystems include a plurality of parallelly expanded multi-channel channel characteristic emulation terminals, where the multi-channel channel characteristic emulation terminals receive the frequency, the pulse and the time signal input by the time-frequency synthesis and distribution subsystem for the driving, and the multi-channel channel characteristic emulation terminals receive the communication and control instructions from the mathematical simulation and monitoring subsystem, and the multi-channel channel characteristic emulation terminals are connected to the optical fibers output by the optical switching subsystem to realize the parallel scale expansion of a channel characteristic emulation.

In some embodiments, in the step S3, performing the multi-channel parallel channel emulation operation on the redistributed multiplex 10G optical signals by using the multi-channel channel characteristic emulation terminals, so as to obtain the wireless radio-frequency signal added with the emulated channel characteristics, specifically including:
  according to simulation data and control data among signal transmitting devices, signal forwarding devices and signal receiving devices transmitted by the mathematical simulation and monitoring subsystem, generating signals after a channel characteristic change due to a relative motion, a troposphere, an ionosphere, a multipath and a shielding, so as to realize the multi-channel parallel channel emulation operation;
  obtaining emulated intermediate frequency signals by the digital signals subjected to the multi-channel parallel channel emulation operation through a digital-to-analog conversion, and transmitting the emulated intermediate frequency signals to each signal receiving terminal as wireless radio-frequency signals added with the emulated channel characteristics after a simulation up-conversion processing, a filtering and a power adjustment.

Figure 5:
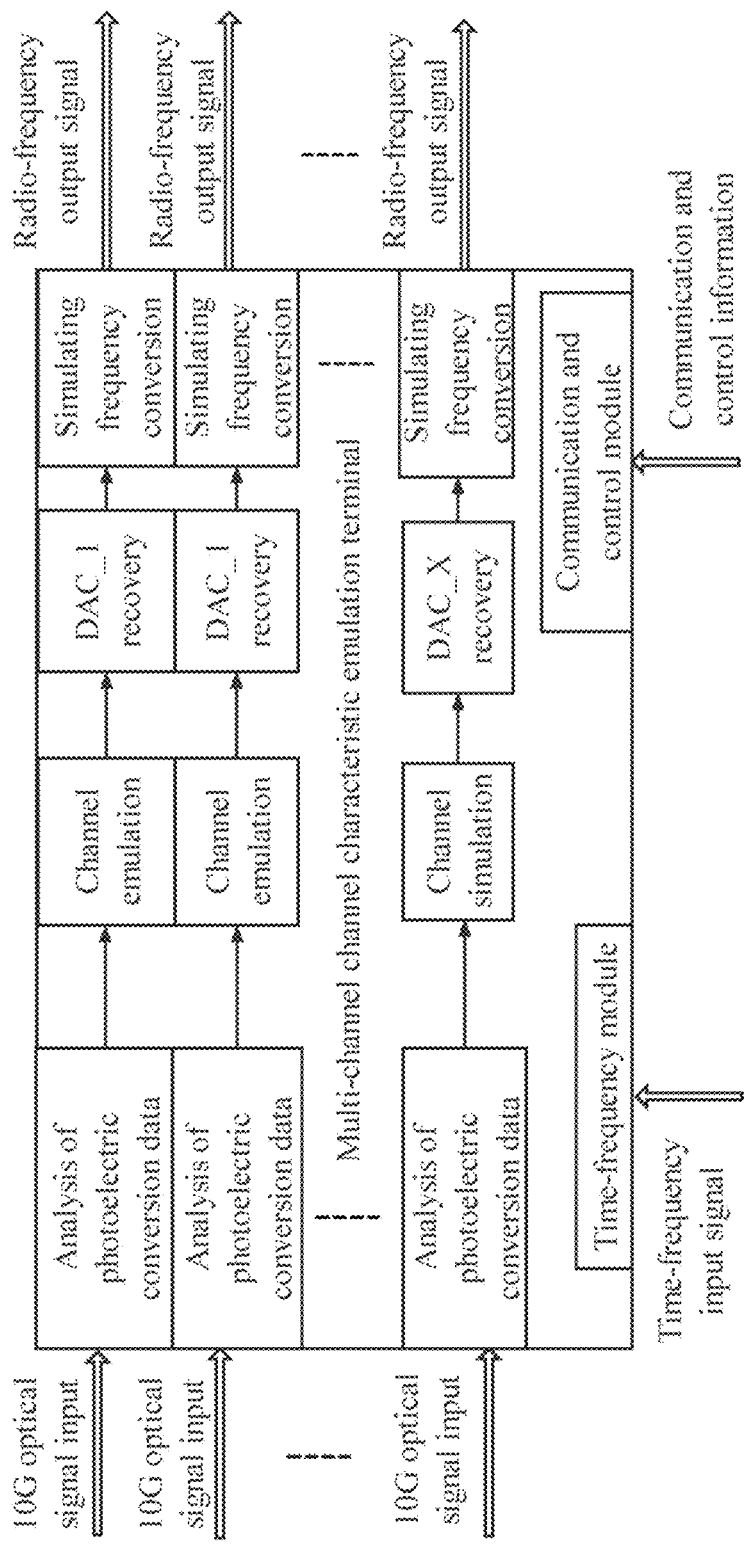
FIG. 5 is a schematic diagram of a parallelly expanded parallelly expanded multi-channel characteristic emulation terminals according to an embodiment of the present application.

FIG. 5 is a schematic diagram of a parallelly expanded multi-channel characteristic emulation terminals according to an embodiment of the present application. As shown in FIG. 5, the parallelly expanded channel characteristic emulation subsystem includes a plurality of parallelly expanded multi-channel channel characteristic emulation terminals, and the functional composition is shown in FIG. 4. The multi-channel channel characteristic emulation terminals uniformly receive a frequency, a pulse and a time signal input by the time-frequency synthesis and distribution subsystem for a driving, and receive communication and control instructions from the mathematical simulation and monitoring subsystem, so that a parallel scale expansion of the channel characteristic emulation may be realized directly by increasing the number of devices. The terminal receives the optical signals from the rectangular optical switching subsystem through optical fiber, converts the optical signals into data signal form through photoelectric conversion module, analyzes and processes the data encapsulation according to relevant protocols, and processes the digital signals of each channel according to the simulation data and control data such as time delay, Doppler, power, phase and visibility among massive signal transmitting devices, signal forwarding devices and signal receiving devices transmitted by the mathematical simulation and monitoring subsystem to generate signals with changed signal characteristics due to relative motion, troposphere, ionosphere, multipath, shielding and other reasons, and the multi-channel parallel channel emulation operation is performed, and the obtained digital signals are converted into emulated intermediate frequency signals through DAC converters; then simulation up-conversion is carried out, and after power adjustment is completed, the wireless radio-frequency signals with added channel characteristics are finally output to different signal receiving terminals, thus completing the channel characteristic emulation function of the system.

In addition, the mathematical simulation and monitoring subsystem is the application-layer supporting software of massive channel emulation system, and its functional components mainly include mathematical simulation calculation and simulation instruction processing function, system workflow control and state monitoring function, and are divided into mathematical simulation calculation, simulation instruction processing, workflow control and state monitoring modules. The digital simulation and monitoring subsystem emulates the relative motion trajectory according to the relevant mathematical model, calculates the signal observation obtained by the signal receiver, generates the control parameters required by the channel emulation channel according to various channel observation data, including parameters such as time delay, Doppler, power, phase shift and multipath, and sends relevant instructions to each acquisition preprocessing terminal and channel emulation terminal to control the channel equipment to complete the channel emulation process. At the same time, all kinds of devices, communication lines and system working state in the system are monitored in real time, and the current system working state, including device working state (normal, fault and off-line) and standby working parameters, is displayed clearly and intuitively by using various ways such as graphics, images and tables, and detailed fault diagnosis information is given in different alarm forms to assist maintenance personnel in locating and troubleshooting faults as soon as possible. The communication interconnection between the internal devices of the mathematical simulation and monitoring subsystem and with other subsystems may adopt, but is not limited to, communication interaction forms such as network cables or optical fibers.

The time-frequency synthesis and distribution subsystem is responsible for comprehensively generating the frequency, pulse and time signals required by the system, and providing time-frequency support for other subsystems. The time-frequency synthesis and distribution subsystem consists of front-stage generation and distribution device and rear-stage terminal device, and all time-frequency terminals adopt unified structure and modular design. The front-stage generation and distribution device is the time-frequency signal generation and distribution terminal, and comprehensively generates the required special frequency point signals, completes the frequency modulation and phase modulation requirements required by the system, and realizes the distribution of standard time-frequency signals, which is used as the reference standard for the rear-stage terminal device. The rear-stage terminal device is composed of several time-frequency distribution terminals, which are used for secondary distribution of various standard time-frequency signals distributed at the front stage, and output all time-frequency signals required for generating other subsystems. The time-frequency signal transmission between the internal device of the time-frequency synthesis and distribution subsystem and with other subsystems may adopt but is not limited to cables or optical fibers.

The self-checking and self-correcting subsystem mainly completes the state self-checking and link self-correcting functions of the system. The self-checking and self-correcting signals output by the self-checking and self-correcting signal generating device are coupled into the channel pre-processing device through the splitter, and then coupled out from the signals output by the channel processing device after passing through the switch and the channel processing device, and returned to the self-checking and self-correcting signal receiving device to demodulate the signals, thus completing the self-checking and self-correcting processing of the whole channel emulation subsystem. The signal transmission between the internal devices of the self-checking and self-correcting subsystem and with other subsystems may be in the form of but not limited to cable or optical fibers.

The subsystems are interconnected by various optical fiber connections. When the external signal docking device or system may not be centrally deployed due to geographical and site restrictions, all subsystems in the system and all single device in the subsystem may be remotely deployed in a centralized-distributed layout, thus realizing the remote docking of the external signal docking device or system. The mutual distance between the device is only limited by the optical fiber transmission capacity (ranging from hundreds of meters to thousands of kilometers), which meets the requirements of various site layouts and application scenarios. The details are as follows:

distributed system layout mode of massive multiple-input multiple-output channel emulation system based on optical matrix switching. Considering that some signal transmitting devices, signal forwarding devices and signal receiving devices (such as large communication stations and assembled satellites) are limited by size, weight, installation state, inability to move easily and physical distance (hundreds of meters or even thousands of kilometers) between them, it is basically difficult to connect docking signals; there are good site conditions, which are suitable for centralized device layout; most of the devices may be arranged centrally, and a small number of docking device is inconvenient to move due to various reasons. In view of the above-mentioned different situations, the massive multiple-input multiple-output channel emulation system based on an optical matrix switching designed by the application may be adaptively distributed and connected to various test device. The transmission forms of various signals, data and information between subsystems and devices in the system may use optical fibers such as gigabit and 10 gigabit, and the transmission distance is not limited, which may support the range of hundreds of meters to thousands of kilometers. Therefore, for all kinds of multiple signal transmitting devices, signal forwarding devices, signal receiving devices, etc. that need to access the system at a long distance, multi-channel channel preprocessing terminals (docking signal transmitting device and signal forwarding device) and multi-channel characteristic emulation terminals (docking signal receiving device and signal forwarding device) may be laid to the position where the signal transceiver/forwarding device is located and directly docked with them, and then the output signal of the multi-channel channel preprocessing terminal, the input signal of the multi-channel characteristic emulation terminal, and the internal time-frequency and communication of the system are interconnected in the form of optical fibers to form a unified system.

The massive multiple-input multiple-output channel emulation system has the ability of parallel expansion of input and output channel scales. When the signal scale of the channel input terminal is expanded, the number of multi-channel channel preprocessing terminals of the channel preprocessing subsystem is increased in parallel, which is used to access the newly added input signals and output the increased multi-channel channel preprocessing terminals of the channel preprocessing subsystem to the corresponding expansion part of the optical switching subsystem. When the signal scale of the channel output terminal is expanded, the number of multi-channel channel characteristic emulation terminals of the characteristic emulation subsystem is increased in parallel, which is used to output the newly increased output signal and access the output optical fiber of the corresponding expansion part of the optical switching subsystem. When the signal scale of at the input and output end of the channel is expanded, the number of optical switching boards is expanded in parallel, and the data transmission map relationship between the input and output ports of the newly expanded optical switching boards is adjusted through instruction control, so as to ensure the correct mapping relationship between the newly added multi-channel channel preprocessing terminal and the multi-channel characteristic emulation terminal accessing the optical fiber, and the original access terminals are not affected.

The above-mentioned massive multiple-input multiple-output system architecture based on optical matrix switching has a wide application range, and the architecture has the advantages of supporting parallel expansion of system scale, supporting distributed remote access, and supporting massive multiple-input multiple-output signal transceiver, and may be applied to, but not limited to, the massive signal transceiving processing requirements of massive communication systems (such as ground operation control systems supporting massive aerospace systems and massive multi-channel ground long-range radar systems), the centralized management and distributed layout requirements of long-range distributed signal transceiving systems (such as wide-area ground-based signal receiving and monitoring, wide-area deployed radar systems, etc.), and the parallel scale expansion requirements of massive multiple-input multiple-output access systems (for example, MIMO).

In an aspect of the application discloses a massive multiple-input multiple-output channel emulation device based on an optical matrix switching. The device is realized based on a massive multiple-input multiple-output channel emulation system, and as shown in FIG. 1, the massive multiple-input multiple-output channel emulation system includes a plurality of channel preprocessing subsystems, an optical switching subsystem, a plurality of channel characteristic emulation subsystems, a time-frequency synthesis and distribution subsystem, a mathematical simulation and monitoring subsystem and a self-checking and self-correcting subsystem.

Figure 6:
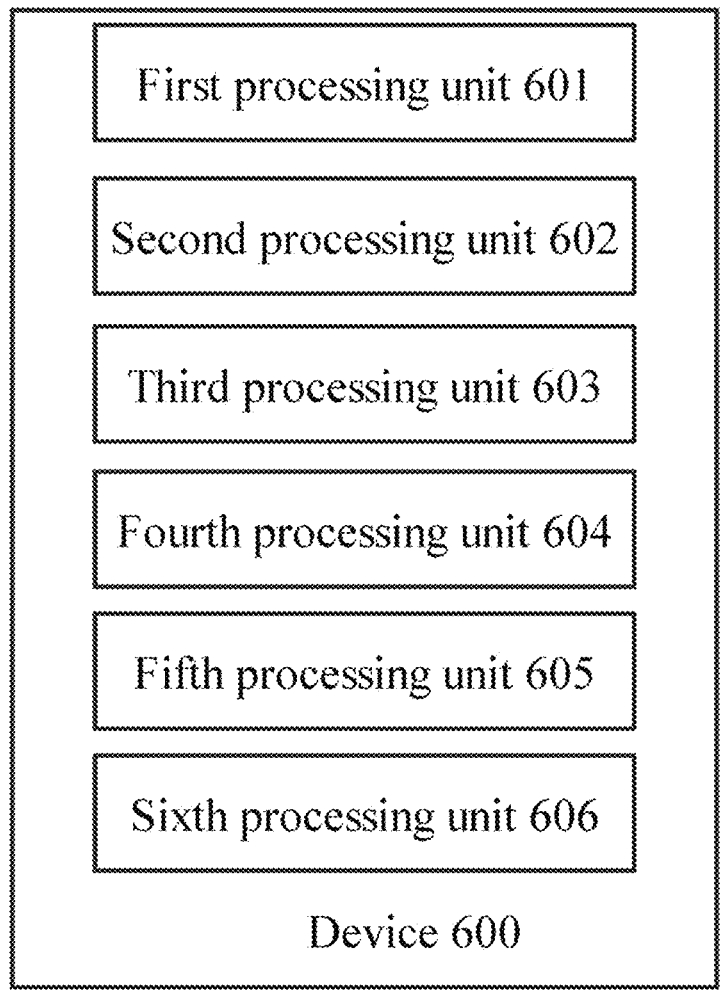
FIG. 6 is a structural diagram of a massive multiple-input multiple-output channel emulation device based on an optical matrix switching according to an embodiment of the present application.

FIG. 6 is a structural diagram of a massive multiple-input multiple-output channel emulation device based on an optical matrix switching according to an embodiment of the present application. As shown in FIG. 6, the device specifically includes:

- a first processing unit 601, configured to call the plurality of channel preprocessing subsystems to receive multiplex radio-frequency input signals with same signal sources or different signal sources to preprocess the multiplex radio-frequency input signals, and transmitting the preprocessed multiplex radio-frequency input signals to the optical switching subsystem through the optical fibers in a form of multiplex 10G optical signals, where each of 10G optical signals includes a plurality of groups of data;
- a second processing unit 602, configured to call the optical switching subsystem, and based on identification results of a plurality of input ports of the optical switching subsystem for each group of data contained in the multiplex 10G optical signals, distributing the each group of data to a plurality of output ports of the optical switching subsystem according to specified addresses, so as to output redistributed multiplex 10G optical signals to the plurality of channel characteristic emulation subsystems through the plurality of output ports; and
- a third processing unit 603, configured to call the plurality of channel characteristic emulation subsystems to perform a multi-channel parallel channel emulation operation on the redistributed multiplex 10G optical signals to obtain wireless radio-frequency signals added with emulated channel characteristics, and the wireless radio-frequency signals are transmitted to each signal receiving terminal.

In an aspect of the device of the present application, the channel preprocessing subsystems include a plurality of distributed and parallelly expanded multi-channel channel preprocessing terminals, where the multi-channel channel preprocessing terminals receive a frequency, a pulse and a time signal input by the time-frequency synthesis and distribution subsystem for a driving, and the multi-channel channel preprocessing terminals receive communication and control instructions from the mathematical simulation and monitoring subsystem; the multi-channel channel preprocessing terminals are connected to the optical switching subsystem through optical fibers, so that a parallel scale expansion of a number of channel preprocessing links is realized.

In an aspect of the device of the present application, the first processing unit 601 is specifically configured to that the multi-channel channel preprocessing terminal is used to perform a preprocessing on the multiplex radio-frequency input signals, specifically including:

adjusting a signal power of the multiplex radio-frequency input signals, performing a simulation down-conversion and out-of-band filtering processing, and sampling obtained intermediate frequency signals after an analog-to-digital conversion to obtain sampled digital signals;

performing a digital down-conversion and decimation filtering processing on the digital signals, and obtaining the multiplex 10G optical signals through a packaging processing and an electro-optical conversion.

In an aspect of the device of the present application, the optical switching subsystem receives control and scheduling instructions from the mathematical simulation and monitoring subsystem, the plurality of input ports identify indication marks of the each group of data in the multiplex 10G optical signals; the second processing unit 602 is specifically configured to call the optical switching subsystem to distribute the each group of data to the plurality of output ports of the optical switching subsystem according to the specified addresses based on the identification result, thus realizing a multiple-input multiple-output scheduling, specifically including: a same output port receives a plurality of groups of data from different input ports, and the plurality of groups of data from a same input port are transmitted to different output ports.

In an aspect of the device of the present application, when an adding or deleting processing of the multi-channel channel preprocessing terminals is terminated, other multi-channel channel preprocessing terminals maintain an original state; the optical switching subsystem has a main engine and a standby engine, the main engine and the standby engine respectively have a function of independently supporting the optical switching subsystem, and when the main engine fails, the standby engine is seamlessly switched to maintain the optical switching subsystem in a working state; the optical switching subsystem has a scale parallel expansion ability, and when a scale expansion is performed on input-output links of the massive multiple-input multiple-output channel emulation system, a scale of an optical switching board of the optical switching subsystem is directly expanded in parallel.

In an aspect of the device of the present application, the plurality of channel characteristic emulation subsystems include a plurality of parallelly expanded multi-channel channel characteristic emulation terminals, where the multi-channel channel characteristic emulation terminals receive the frequency, the pulse and the time signal input by the time-frequency synthesis and distribution subsystem for the driving, and the multi-channel channel characteristic emulation terminals receive the communication and control instructions from the mathematical simulation and monitoring subsystem, and the multi-channel channel characteristic emulation terminals are connected to the optical fibers output by the optical switching subsystem to realize the parallel scale expansion of a channel characteristic emulation.

In an aspect of the device of the present application, the third processing unit 603 is specifically configured to perform the multi-channel parallel channel emulation operation on the redistributed multiplex 10G optical signals by using the multi-channel channel characteristic emulation terminals, so as to obtain the wireless radio-frequency signal added with the emulated channel characteristics, specifically including:

according to simulation data and control data among signal transmitting devices, signal forwarding devices and signal receiving devices transmitted by the mathematical simulation and monitoring subsystem, generating signals after a channel characteristic change due to a relative motion, a troposphere, an ionosphere, a multipath and a shielding, so as to realize the multi-channel parallel channel emulation operation;

obtaining emulated intermediate frequency signals by the digital signals subjected to the multi-channel parallel channel emulation operation through a digital-to-analog conversion, and transmitting the emulated intermediate frequency signals to the each signal receiving terminal as wireless radio-frequency signals added with the emulated channel characteristics after a simulation up-conversion processing, a filtering and a power adjustment.

In an aspect of the device of the present application, the device further optionally/additionally includes:

a fourth processing unit 604 is configured to call the time-frequency synthesis and distribution subsystem, comprehensively generate required frequency, pulse and time signals according to external or internal frequency source signals, complete frequency modulation and phase modulation operations, perform secondary distribution according to scale requirements, and provide time-frequency reference signals for all subsystem devices by optical fiber transmission;

a fifth processing unit 605 is configured to call the mathematical simulation and monitoring subsystem, which is used to emulate and calculate the trajectories and various dynamic parameters between massive signal transmission channels, send control instructions and simulation parameter configuration instructions to each subsystem, and complete the operation, driving and monitoring control of the system, where all kinds of data transmission are completed based on gigabit optical fiber interconnection; and a sixth processing unit 606 is configured to call the self-checking and self-correcting subsystem, generate and output self-checking and self-correcting signals, couple into the channel preprocessing device, couple out of the signals output by the channel processing device, demodulate and process the signals to complete the self-checking and self-correcting, where the signal transmission is completed in the form of optical fiber interconnection.

In an aspect of the device of the present application, the fourth processing unit 604 is specifically configured to comprehensively generate required frequency, pulse and time signals, complete frequency modulation and phase modulation operations, and distribute the required time-frequency signals to the terminals of each subsystem according to the system scale requirements, including:

consisting of front-stage generation and distribution device and rear-stage terminal device, and all time-frequency terminals adopt unified structure and modular design. The front-stage generation and distribution device is the time-frequency signal generation and distribution terminal, and comprehensively generates the required special frequency point signals, completes the frequency modulation and phase modulation requirements required by the system, and realizes the distribution of standard time-frequency signals, which is used as the reference standard for the rear-stage terminal device;

the rear-stage terminal device is composed of several time-frequency distribution terminals, which are used for secondary distribution of various standard time-frequency signals distributed at the front stage, and output all time-frequency signals required for generating other subsystems. The time-frequency signal transmission between the internal device of the time-frequency synthesis and distribution subsystem and with other subsystems may adopt but is not limited to cables or optical fibers.

In an aspect of the device of the present application, the fifth processing unit 605 is specifically configured to emulate and calculate trajectories and various dynamic parameters between massive signal transmission channels, send control instructions and simulation parameter configuration instructions to each subsystem, and complete the operation drive and monitoring control of the system, including:

the mathematical simulation and monitoring subsystem is the application-layer supporting software of massive channel emulation system, and its functional components mainly include mathematical simulation calculation and simulation instruction processing function, system workflow control and state monitoring function, and are divided into mathematical simulation calculation, simulation instruction processing, workflow control and state monitoring modules.

The digital simulation and monitoring subsystem emulates the relative motion trajectory according to the relevant mathematical model, calculates the signal observation obtained by the signal receiver, generates the control parameters required by the channel emulation channel according to various channel observation data, including parameters such as time delay, Doppler, power, phase shift and multipath, and sends relevant instructions to each terminal. At the same time, all kinds of devices, communication lines and system working state in the system are monitored in real time, and the current system working state is displayed clearly and intuitively by using various ways such as graphics, images and tables. The communication interconnection with other subsystems may adopt, but is not limited to, communication interaction forms such as network cables or optical fibers.

In an aspect of the device of the present application, the sixth processing unit 606 is specifically configured to generate and output a self-checking and self-correcting signals, couple into the channel preprocessing device, couple out from the signal output by the channel processing device, and demodulate the signal to complete the self-checking and self-correcting, including:

the self-check and link self-correcting functions of the system are completed; the self-checking and self-correcting signals output by the self-checking and self-correcting signal generating device are coupled into the channel preprocessing device through the splitter, and then coupled out from the signals output by the channel processing device after passing through the switch and the channel processing device, and returned to the self-checking and self-correcting signal receiving device to demodulate the signals, thus completing the self-checking and self-correcting processing of the whole channel emulation subsystem. The signal transmission between the internal devices of the self-checking and self-correcting subsystem and other subsystems may be in the form of but not limited to cables or optical fibers.

In an aspect of the application discloses an electronic device. The electronic device includes a memory and a processor, where the memory stores a computer program, and when the processor executes the computer program, the steps in the massive multiple-input multiple-output channel emulation method based on an optical matrix switching described in any one of an aspect of the present disclosure are realized.

Figure 7:
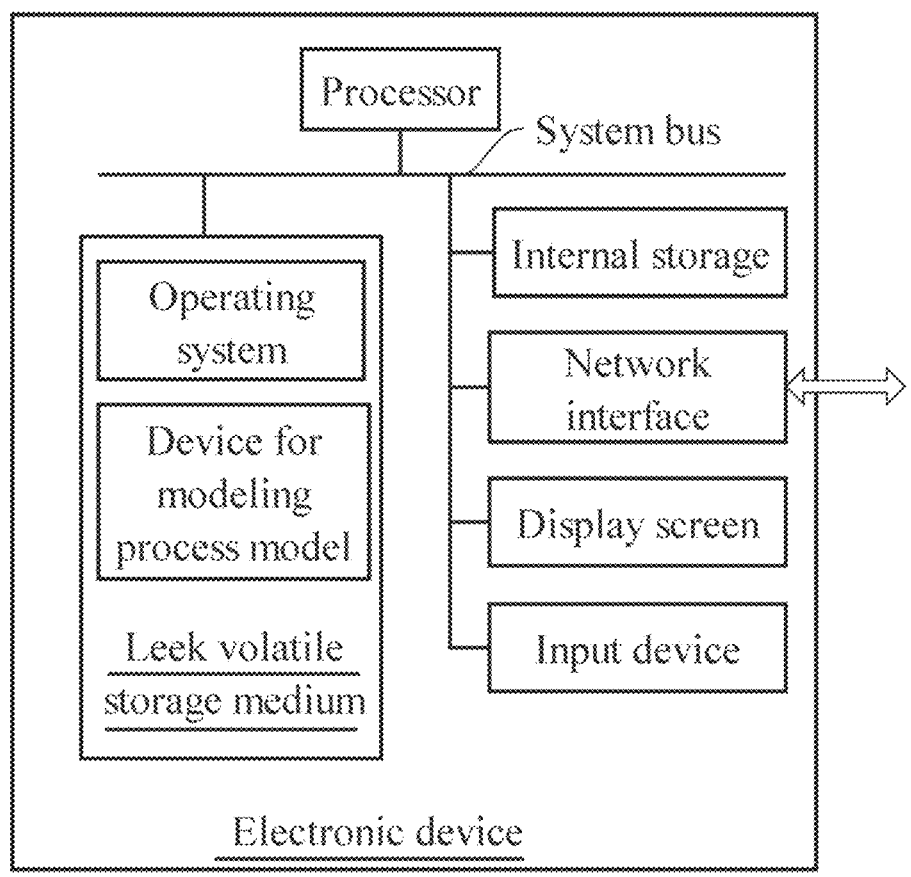
FIG. 7 is a structural diagram of an electronic device according to an embodiment of the present application.

FIG. 7 is a structural diagram of an electronic device according to an embodiment of the present application. As shown in FIG. 7, the electronic device includes a processor, a memory, a communication interface, a display screen and an input device connected through a system bus, and the processor of the electronic device is used for providing computing and control capabilities. The memory of the electronic device includes a nonvolatile storage medium and an internal memory. The nonvolatile storage medium stores an operating system and a computer program. The internal memory provides an environment for the operation of the operating system and computer programs in the nonvolatile storage medium. The communication interface of the electronic device is used for wired or wireless communication with external terminals, and the wireless mode may be realized by WIFI, operator network, near field communication (NFC) or other technologies. The display screen of the electronic device may be a liquid crystal display screen or an electronic ink display screen, and the input device of the electronic device may be a touch layer covered on the display screen, a button, a trackball or a touchpad arranged on the shell of the electronic device, and an external keyboard, touchpad or mouse.

It may be understood by those skilled in the art that the structure shown in FIG. 7 is only a structural diagram of the part related to the technical scheme of the present disclosure, and does not constitute a limitation on the electronic device to which the scheme of the present application is applied. The specific electronic device may include more or less components than those shown in the figure, or combine some components, or have different component arrangements.

In an aspect of the present application discloses a computer-readable storage medium. A computer program is stored on the computer-readable storage medium, and when the computer program is executed by a processor, the steps in the massive multiple-input multiple-output channel emulation method based on an optical matrix switching described in any one of an aspect of the present disclosure are realized.

Compared with the prior art, the technical scheme provided by the application has the beneficial effects that the channels of the conventional channel emulation device are independent from each other, and each channel emulation hardware link supports the channel emulation function of a signal link with one signal input corresponding to one signal output, that is, the conventional channel emulation device may not support the single-input multi-output mode with one signal input corresponding to multiple signal outputs, and may not support the multi-input multi-output mode with multiple signal inputs corresponding to multiple signal outputs and the flexible switching requirements of the corresponding relationship. By designing a parallelly expanded channel preprocessing terminal and a channel characteristic emulation terminal with electro-optical/photoelectric conversion interface, the data of multiple-input multiple-output signals are aggregated, copied and distributed in the form of high-density matrix optical switching, and a massive channel emulation system with the ability of realizing dynamic cross interconnection and docking between massive wireless signals is realized. The channel docking efficiency is compared with that of conventional channel emulation device, as shown in FIG. 5. It will not affect the consistency between multiple links or the collaborative simulation between multiple links to increase the number of device sets and the data capacity of optical switching matrix. With the hardware links required by N channels, the simulation scale capacity of N×N matrix channels may be realized, and the benefits of expanding the scale of parallel channel emulation links in a multiple relationship by direct connection may be obtained. The larger the system scale, the greater the benefits obtained by the hardware links required for each additional channel. For example, the 9-in-9-out scale may support 81 channel emulations. On this basis, by adding a hardware link required by one channel, 10-in-10-out namely a total of 100 channel emulation capabilities may be obtained. At the cost of adding a hardware link required by one channel, the ability to add 19 channel emulations on the original basis may be obtained, which significantly reduces the complexity of realizing a massive channel emulation system and the difficulty of parallel scale expansion. With the hardware device of N channels, the simulation ability of N×N channels is realized, which greatly reduces the hardware cost of massive channel system compared with the conventional mode. All signals between devices in the system are interconnected by optical fibers, and each subsystem in the system and each single device in the subsystem may be distributed, and the mutual distance between devices is only limited by the optical fiber transmission capacity (ranging from hundreds of meters to thousands of kilometers), thus meeting the requirements of various venues and application scenarios; this massive multiple-input multiple-output system architecture based on the optical matrix switching is not only limited to the realization of channel emulation system, but also may be used for the design and implementation of various massive communication, radar and electronic countermeasures system supporting signal transmission and reception.

Please note that the technical features of the above embodiments may be combined at will. In order to make the description concise, all possible combinations of the technical features in the above embodiments are not described. However, as long as there is no contradiction between the combinations of these technical features, they should be considered as the scope recorded in this specification. The above-mentioned embodiments only express several practical ways of the application, and their descriptions are more specific and detailed, but they may not be understood as limiting the scope of the application patent. It should be pointed out that for those skilled in the art, several variations and improvements may be made without departing from the concept of this application, which are within the protection scope of this application. Therefore, the scope of protection of the patent in this application shall be subject to the appended claims.

What is claimed is:

1. A massive multiple-input multiple-output channel emulation method based on an optical matrix switching, wherein the method is realized based on a massive multiple-input multiple-output channel emulation system, the massive multiple-input multiple-output channel emulation system comprises a plurality of channel preprocessing subsystems, an optical switching subsystem, a plurality of channel characteristic emulation subsystems, a time-frequency synthesis and distribution subsystem, a mathematical simulation and monitoring subsystem and a self-checking and self-correcting subsystem;

the channel preprocessing subsystems comprise a plurality of distributed and parallelly expanded multi-channel channel preprocessing terminals, wherein the multi-channel channel preprocessing terminals receive a frequency, a pulse and a time signal input by the time-frequency synthesis and distribution subsystem for a driving, and the multi-channel channel preprocessing terminals receive communication and control instructions from the mathematical simulation and monitoring subsystem; the multi-channel channel preprocessing terminals are connected to the optical switching subsystem through optical fibers, so that a parallel scale expansion of a number of channel preprocessing links is realized;

the method specifically comprises following steps:

step S1, receiving multiplex radio-frequency input signals with same signal sources or different signal sources by the plurality of channel preprocessing subsystems to preprocess the multiplex radio-frequency input signals, and transmitting the preprocessed multiplex radio-frequency input signals to the optical switching subsystem through the optical fibers in a form of multiplex 10G optical signals, wherein each of 10G optical signals comprises a plurality of groups of data;

when an adding or deleting processing of the multi-channel channel preprocessing terminals is terminated, other multi-channel channel preprocessing terminals maintain an original state;

step S2, based on identification results of a plurality of input ports of the optical switching subsystem for each group of data contained in the multiplex 10G optical signals, distributing the each group of data to a plurality of output ports of the optical switching subsystem according to specified addresses, so as to output redistributed multiplex 10G optical signals to the plurality of channel characteristic emulation subsystems through the plurality of output ports;

the optical switching subsystem receives control and scheduling instructions from the mathematical simulation and monitoring subsystem, the plurality of input ports identify indication marks of the each group of data in the multiplex 10G optical signals, and the optical switching subsystem distributes the each group of data to the plurality of output ports of the optical switching subsystem according to the specified addresses based on the identification results, thus realizing a multiple-input multiple-output scheduling, specifically comprising: a same output port receives a plurality of groups of data from different input ports, and the plurality of groups of data from a same input port are transmitted to different output ports;

the optical switching subsystem has a main engine and a standby engine, the main engine and the standby engine respectively have a function of independently supporting the optical switching subsystem, and when the main engine fails, the standby engine is seamlessly switched to maintain the optical switching subsystem in a working state;

the optical switching subsystem has a scale parallel expansion ability, and when a scale expansion is performed on input-output links of the massive multiple-input multiple-output channel emulation system, a scale of an optical switching board of the optical switching subsystem is directly expanded in parallel; and step S3, performing a multi-channel parallel channel emulation operation on the redistributed multiplex 10G optical signals by the plurality of channel characteristic emulation subsystems to obtain wireless radio-frequency signals added with emulated channel characteristics, and transmitting the wireless radio-frequency signals to each signal receiving terminal;

the plurality of channel characteristic emulation subsystems comprise a plurality of parallelly expanded multi-channel channel characteristic emulation terminals, wherein the multi-channel channel characteristic emulation terminals receive the frequency, the pulse and the time signal input by the time-frequency synthesis and distribution subsystem for the driving, and the multi-channel channel characteristic emulation terminals receive the communication and control instructions from the mathematical simulation and monitoring subsystem, and the multi-channel channel characteristic emulation terminals are connected to the optical fibers output by the optical switching subsystem to realize the parallel scale expansion of a channel characteristic emulation.

2. The massive multiple-input multiple-output channel emulation method based on the optical matrix switching according to claim 1, wherein in the step S1, the multi-channel channel preprocessing terminal is used to perform a preprocessing on the multiplex radio-frequency input signals, specifically comprising:

adjusting a signal power of the multiplex radio-frequency input signals, performing a simulation down-conversion and out-of-band filtering processing, and sampling obtained intermediate frequency signals after an analog-to-digital conversion to obtain sampled digital signals;

performing a digital down-conversion and decimation filtering processing on the digital signals, and obtaining the multiplex 10G optical signals through a packaging processing and an electro-optical conversion.

3. The massive multiple-input multiple-output channel emulation method based on the optical matrix switching according to claim 1, wherein in the step S3, performing the multi-channel parallel channel emulation operation on the redistributed multiplex 10G optical signals by using the multi-channel channel characteristic emulation terminals, so as to obtain the wireless radio-frequency signal added with the emulated channel characteristics, specifically comprising:

according to simulation data and control data among each of signal transmitting devices, signal forwarding devices and signal receiving devices transmitted by the mathematical simulation and monitoring subsystem, generating signals after a channel characteristic change due to a relative motion, a troposphere, an ionosphere, a multipath and a shielding, so as to realize the multi-channel parallel channel emulation operation;

obtaining emulated intermediate frequency signals by the digital signals subjected to the multi-channel parallel channel emulation operation through a digital-to-analog conversion, and transmitting the emulated intermediate frequency signals to the each signal receiving terminal as wireless radio-frequency signals added with the emulated channel characteristics after a simulation up-conversion processing, a filtering and a power adjustment.

4. A massive multiple-input multiple-output channel emulation device based on an optical matrix switching, wherein:

the device is realized based on a massive multiple-input multiple-output channel emulation system, and the massive multiple-input multiple-output channel emulation system comprises a plurality of channel preprocessing subsystems, an optical switching subsystem, a plurality of channel characteristic emulation subsystems, a time-frequency synthesis and distribution subsystem, a mathematical simulation and monitoring subsystem and a self-checking and self-correcting subsystem;

the channel preprocessing subsystems comprise a plurality of distributed and parallelly expanded multi-channel channel preprocessing terminals, wherein the multi-channel channel preprocessing terminals receive a frequency, a pulse and a time signal input by the time-frequency synthesis and distribution subsystem for a driving, and the multi-channel channel preprocessing terminals receive communication and control instructions from the mathematical simulation and monitoring subsystem; the multi-channel channel preprocessing terminals are connected to the optical switching subsystem through optical fibers, so that a parallel scale expansion of a number of channel preprocessing links is realized;

the device specifically comprises:

a first processing unit, configured to control the plurality of channel preprocessing subsystems to receive multiplex radio-frequency input signals with same signal sources or different signal sources to preprocess the multiplex radio-frequency input signals, and transmitting the preprocessed multiplex radio-frequency input signals to the optical switching subsystem through the optical fibers in a form of multiplex 10G optical signals, wherein each of 10G optical signals comprises a plurality of groups of data;

when an adding or deleting processing of the multi-channel channel preprocessing terminals is terminated, other multi-channel channel preprocessing terminals maintain an original state;

a second processing unit, configured to control the optical switching subsystem, and based on identification results of a plurality of input ports of the optical switching subsystem for each group of data contained in the multiplex 10G optical signals, distributing the each group of data to a plurality of output ports of the optical switching subsystem according to specified addresses, so as to output redistributed multiplex 10G optical signals to the plurality of channel characteristic emulation subsystems through the plurality of output ports;

the optical switching subsystem receives control and scheduling instructions from the mathematical simulation and monitoring subsystem, the plurality of input ports identify indication marks of the each group of data in the multiplex 10G optical signals, and the optical switching subsystem distributes the each group of data to the plurality of output ports of the optical switching subsystem according to the specified addresses based on the identification result, thus realizing a multiple-input multiple-output scheduling, specifically comprising: a same output port receives a plurality of groups of data from different input ports, and the plurality of groups of data from a same input port are transmitted to different output ports;

the optical switching subsystem has a main engine and a standby engine, the main engine and the standby engine respectively have a function of independently supporting the optical switching subsystem, and when the main engine fails, the standby engine is seamlessly switched to maintain the optical switching subsystem in a working state; the optical switching subsystem has a scale parallel expansion ability, and when a scale expansion is performed on input-output links of the massive multiple-input multiple-output channel emulation system, a scale of an optical switching board of the optical switching subsystem is directly expanded in parallel;

a third processing unit, configured to control the plurality of channel characteristic emulation subsystems to perform a multi-channel parallel channel emulation operation on the redistributed multiplex 10G optical signals to obtain wireless radio-frequency signals added with emulated channel characteristics, and the wireless radio-frequency signals are transmitted to each signal receiving terminal;

the plurality of channel characteristic emulation subsystems comprise a plurality of parallelly expanded multi-channel channel characteristic emulation terminals, wherein multi-channel channel characteristic emulation terminals receive the frequency, the pulse and the time signal input by the time-frequency synthesis and distribution subsystem for the driving, and the multi-channel channel characteristic emulation terminals receive the communication and control instructions from the mathematical simulation and monitoring subsystem, and the multi-channel channel characteristic emulation terminals are connected to the optical fibers output by the optical switching subsystem to realize the parallel scale expansion of a channel characteristic emulation.

5. An electronic device, comprising a memory and a processor, wherein the memory stores a computer program, and when the processor executes the computer program, the steps in the massive multiple-input multiple-output channel emulation method based on the optical matrix switching according to claim 1 are executed.

6. An electronic device comprising a memory and a processor, wherein the memory stores a computer program, and when the processor executes the computer program, the steps in the massive multiple-input multiple-output channel emulation method based on the optical matrix switching according to claim 2 are executed.

7. An electronic device comprising a memory and a processor, wherein the memory stores a computer program, and when the processor executes the computer program, the steps in the massive multiple-input multiple-output channel emulation method based on the optical matrix switching according to claim 3 are executed.

8. A computer-readable storage medium comprising a nonvolatile storage medium, wherein a computer program is stored on the computer-readable storage medium, and when the computer program is executed by a processor of a device, which device is operatively linked to the computer-readable storage medium, the steps in the massive multiple-input multiple-output channel emulation method based on the optical matrix switching according to claim 1 are executed.

9. A computer-readable storage medium comprising a nonvolatile storage medium, wherein a computer program is stored on the computer-readable storage medium, and when the computer program is executed by a processor of a device, which device is operatively linked to the computer-readable storage medium, the steps in the massive multiple-input multiple-output channel emulation method based on the optical matrix switching according to claim 2 are executed.

10. A computer-readable storage medium comprising a nonvolatile storage medium, wherein a computer program is stored on the computer-readable storage medium, and when the computer program is executed by a processor of a device, which device is operatively linked to the computer-readable storage medium, the steps in the massive multiple-input multiple-output channel emulation method based on the optical matrix switching according to claim 3 are executed.

* * * * *